UNITED STATES PATENT OFFICE 2,303,236

EMULSION

Robert S. Shelton, Mariemont, and Clement L. Huyck, Cincinnati, Ohio, assignors to The Wm. S. Merrell Company, Reading, Ohio, a corporation of Delaware No Drawing. Application June 10, 1941,
Serial No. 397,408

4 Claims. (Cl. 167—66)

This invention relates to improved aqueous emulsions of water immiscible substances, and particularly of oleaginous substances. The improved emulsions are primarily intended for therapeutic purposes. The therapeutic ingredient may be the water immiscible substance which is emulsified in the water, or may be distributed in such material or otherwise dispersed throughout the emulsion.

The new emulsions of the invention have improved stability, and the stability does not seem to be a function of the size of the dispersed particles, as coarse emulsions in which the dispersed phase exists as relatively large droplets have a stability quite comparable to emulsions in which the dispersed phase is in the form of very small droplets. This is quite different from the behavior of emulsions made with most of the common emulsifying agents in which the stability varies with the size of the dispersed particles, emulsions with the dispersed phase in the form of small droplets usually being far more stable than those with the dispersed phase in the form of large droplets.

In accordance with the present invention, precipitated hydrated magnesium trisilicate is used as an emulsifying agent. This material may be represented by the formula $Mg_2Si_3O_8xH_2O$ in which $xH_2O$ represents both the combined and absorbed water. This material is readily prepared in known ways, for example, by the interaction of a magnesium salt and an alkali metal silicate in water.

In preparing the emulsions of the invention, the magnesium trisilicate is used in relatively large quantities, as compared with the quantities of emulsifying agents ordinarily used in preparing emulsions. For example, for producing a stable emulsion of oil in water, as much as 70 to 80% trisilicate, calculated on the weight of the oil, may be used.

The emulsions are ordinarily prepared by suspending the magnesium trisilicate in water to form a fluid or mobile suspension, adding to the suspension the liquid to be emulsified (in the case of solid fats or oleaginous materials or the like at a temperature sufficiently high to liquefy them) and then agitating until the emulsion is formed. However, it is not necessary to follow this procedure in preparing the emulsions as they may be prepared by adding the emulsifying agent and water to the material to be emulsified, in small, successive quantities while agitating, or by adding the emulsifying agent to the water and material to be emulsified, etc. The emulsions so produced are of the oil-in-water type, and may be diluted with water. The size of the droplets of dispersed material will vary, depending upon the degree and extent of agitation. Stable emulsions with dispersed droplets ranging in size from 0.5 mm. down to 1 u. or smaller may be prepared, again depending upon the degree and extent of agitation.

An excess of magnesium trisilicate over that required to produce a stable emulsion does not seem to interfere with the stability of the emulsions, but the use of too little may result in an unstable product. The amount required to produce a stable emulsion will naturally vary with the material being emulsified and the proportions of water and other acids, but 10% or somewhat more based on the final product will ordinarily be required for best results. Less may be employed in some cases.

Stable emulsions may be prepared not only from distilled water but with hard (temporary or permanent) water, salt water, lime water or water containing other dissolved materials.

Two or more water immiscible materials may be dispersed in a single emulsion, either by preparing separate emulsions and mixing them or by emulsifying two or more liquids, either by simultaneous, intermittent, or successive addition to the water.

Further advantages of the new emulsions are that they do not readily separate even upon the addition of various salts or other agents which frequently cause separation of the emulsions commonly used, the emulsifying agent has no deleterious effect when ingested or employed topically and the emulsifying agent is not attacked by bacteria or other organisms.

The invention will be further illustrated by the following specific examples but it is not limited thereto.

*Example 1.*—An emulsion of mineral oil in water, for pharmaceutical purposes, is prepared in the following proportions:

| | Per cent |
|---|---|
| Distilled water | 56.6 to 78.4 |
| Magnesium trisilicate | 8.25 to 16.5 |
| Mineral oil | 13.55 to 27.1 |

In preparing this emulsion, the magnesium trisilicate is suspended in just sufficient water to form a mobile suspension, the mineral oil is added with agitation, and the resulting emulsion is diluted with the rest of the water.

*Example 2.*—Around 11 to 26 parts of castor oil, 15 parts of magnesium trisilicate and water to make 100 parts are agitated to form an emulsion for use as a laxative or purgative.

*Example 3.*—Cod liver oil is substituted for the castor oil of the preceding example, with formation of a stable emulsion.

*Example 4.*—An absorbent and hematinic product, useful for treating peptic ulcers, and having excellent stability, may be prepared by proper agitation, as in a colloid mill, of about 13 parts of magnesium trisilicate, .875 part of ferric hydroxide, 15 parts of heavy mineral oil, 15 parts of glycerin and 52 parts of distilled water, together with such flavoring materials as may be desired. With some flavoring materials, there may be some tendency for separation of the flavoring materials, and in such cases, small amounts of gum acacia or tragacanth may be added, and if such materials are added, a small amount of preservative may be required also.

To the products of the foregoing examples and other emulsions of the invention, suitable flavoring, coloring and preservative materials may be added, as may be various medicinal agents, whether oil or water soluble. In some cases, it may be desirable to add a protective colloid, although this is ordinarily unnecessary.

We claim:

1. A stable emulsion including water, an oleaginous material and precipitated hydrated magnesium trisilicate as an emulsifying agent.

2. A product as in claim 1 in which the oleaginous material is an oil.

3. A product as in claim 1 in which the oleaginous material is a mineral oil.

4. A product as in claim 1 in which the oleaginous material is a glyceride oil.

ROBERT S. SHELTON.
CLEMENT L. HUYCK.